March 20, 1956 J. E. BARTELT 2,739,238

END OF RECORD DETECTOR

Filed July 21, 1952

INVENTOR
JOHN E. BARTELT

BY A. J. Etienne

ATTORNEY

United States Patent Office 2,739,238 Patented Mar. 20, 1956

2,739,238

END OF RECORD DETECTOR

John E. Bartelt, Poughkeepsie, N. Y., assignor to International Business Machines Corporation, New York, N. Y., a corporation of New York Application July 21, 1952, Serial No. 300,016

3 Claims. (Cl. 250—27)

The present invention relates to magnetic record sensing devices and more particularly to means for ascertaining the end of such a record or the end of a group of pulses produced by sensing a unit of recordation on such a record.

In the utilization of magnetic records, it becomes necessary to ascertain when one unit amount of recordation has ended. In the use of magnetic tapes as record mediums, for example, several characters are recorded on the tape, in a group, each character being represented by recordations transverse of the tape and the unit record or group of such characters being represented by a plurality of such transverse recordings, extending the length of the tape. The spacing between successive recordations lengthwise of the tape can for our purposes be considered as uniform. Upon sensing such recordings therefore, a series of output pulses will be obtained from the sensing heads which pulses will be uniformly spaced in time. At the end of the unit group of recordations comprising a unit record, no further recordations exist and hence there will be a break in the uniformity of repetition of the output pulses from the sensing head. Such an end of record phenomenon must be ascertained as a positive indication in the use of magnetic tape, this positive indication being employed either to stop the tape or to produce some change in the procedure of the device such as a computer employing the tape as a source of values or the mechanism for handling the tape.

The novel means of the present invention comprises simple means for directly ascertaining the cessation of output from the sensing heads, of uniformly spaced output pulses, which means produce, upon such cessation, a definite indication of the end of the unit record.

For example, the output produced by a reading head as it reads successive characters of a unit group may comprise repeated square waves whose time duration is dependent upon the type of recordation and whose spacing in time is dependent upon the packing of the characters lengthwise of the tape. Such repeated square waves, having a definite and uniform time separation, are applied to a single-shot multivibrator, the first pulse flipping the multivibrator to its non-stable state, in which it produces an output of time duration dependent upon the time constant of certain of the elements of the multivibrator. Normally, after the expiration of this time, a single-shot multivibrator would slide back or return to its normal or stable condition. However, when a train of pulses is applied, having a time separation which is less than the timing period of the flipped multivibrator, a second pulse will be effective to retain the multivibrator in its flipped or unstable condition, so that it is prevented from returning to its normal or stable condition. This will continue as long as pulses of this time separation are applied to the multivibrator. However, when these pulses are interrupted, so that subsequent to receipt of a last pulse a time period approximating or greater than the timing period of the multivibrator ensues, prior to receipt of a subsequent pulse, the single-shot multivibrator will return to its normal or stable state. This produces on output pulse whose time duration is equal to that of the input pulse plus the time period of the multivibrator, which is thus a definite indication of the cessation of receipt of pulses of the previous time separation or of an end of a pulse group or of an end of record.

One of the objects of the present invention therefore is to provide a novel combination of a source of repeated pulses, normally having a selected time separation, in combination with a single-shot multivibrator whose inherent timing period is greater than the period of time separation of the applied pulses whereby the pulses first flip a single-shot multivibrator and maintain it flipped until no subsequent pulse is applied within the timing period of the multivibrator itself.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 comprises three parts as follows:

Figure 2:
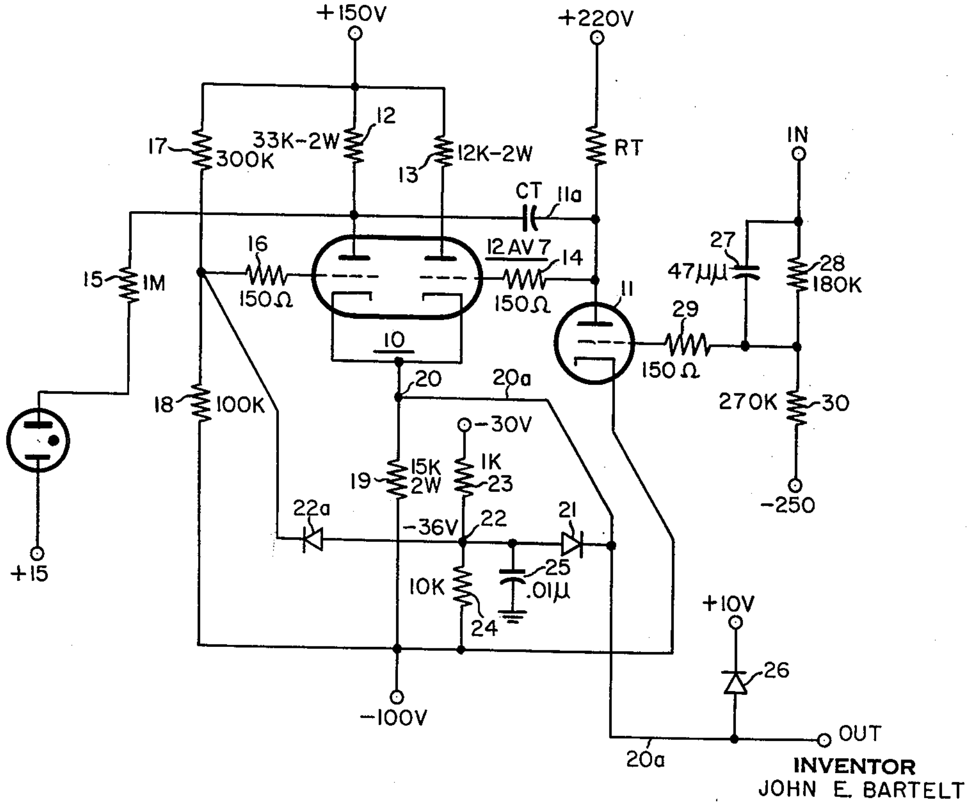

Referring to the drawings and more particularly to Fig. 2, 10 indicates a dual triode tube comprising the main element of a single-shot multivibrator which tube may, for example, comprise a type 12AV7. A triode 11, which may comprise ½ of a 12AV7 is employed as an inverter and upon application of pulses to its input, labeled IN, will flip or maintain flipped, the multivibrator.

The plate of the left hand triode of the dual triode 10 is connected via a 33K, 2 w. resistor 12 to a source of of +150 v. while the plate of the right hand triode is connected to the same source via a 12K, 2 w. resistor 13; K representing the value of the resistor in thousands of ohms and w. indicating watts. The plate of triode 11 is connected via a 150 ohm resistor 14 to the grid of the right hand triode and this plate is also connected via a resistor $R_T$ to a source of +220 v. This plate is also coupled, via a line 11*a* and a condenser $C_T$, to the plate of the left hand triode of dual triode 10, which latter plate is provided with an output indicated by a 1M resistor 15 (1 megohm) which resistor may lead to an indicating neon, as indicated. This latter plate may also be used as the output from the single-shot multivibrator, to another multivibrator or to some other device. The grid of the left hand triode is connected via a 150 ohm resistor 16 and a 300K resistor 17 to the +150 v. source, as shown, while the same 150 ohm resistor 16 via a 100K resistor 18 connects the grid to a —100 v. source. The cathodes of the two triodes of dual triode 10 are joined, as shown, and are connected via a 15K, 2 w. resistor 19, to the —100 v. source. A cathode output labeled 20 is taken from a point between the joined cathodes and the top portion of the resistor 19. A lead 20*a* from this output is connected to the cathode of a diode 21 whose plate is connected to a —36 v. voltage source, which comprise a tap 22 between a 1K resistor 23, connected at its free end to a —30 v. source and a 10K resilstor 24 connected to the —100 v. source. This —36 v. is also connected, as shown, via a diode 22a to the grid of the left hand triode. The plate of diode 21 is also coupled via a .01 microfarad condenser 25 to ground, as shown. Another diode 26 has its plate connected to the output line 20a while its cathode is connected to a source of +10 v. The output labeled OUT, may be fed to a cathode follower whereby when the single-shot multivibrator is operated to its "on" or unstable condition, an output —36 v. is available, while when the single-shot is restored to its normal or "off" condition, an output of +10 v. is available. These diodes may comprise, for example, a Sylvania 1N54 crystal diode.

The input to the inverter 11 labeled IN, is connected via a 47 micromicrofarad condenser 27 and 180K resistor 28, in parallel, both in series with 150 ohm resistor 29 connected to the grid of triode 11 and also both in series with a 270K resistor 30 connected to a source of —250° v.

It is to be specifically understood that all values as given are exemplary only and are those of a preferred embodiment which has been found particularly efficacious in the end of record detecting device comprising the instant invention. Other values will be apparent to those skilled in the art and certain changes in value may be made to fit the desired conditions.

Figure 1:
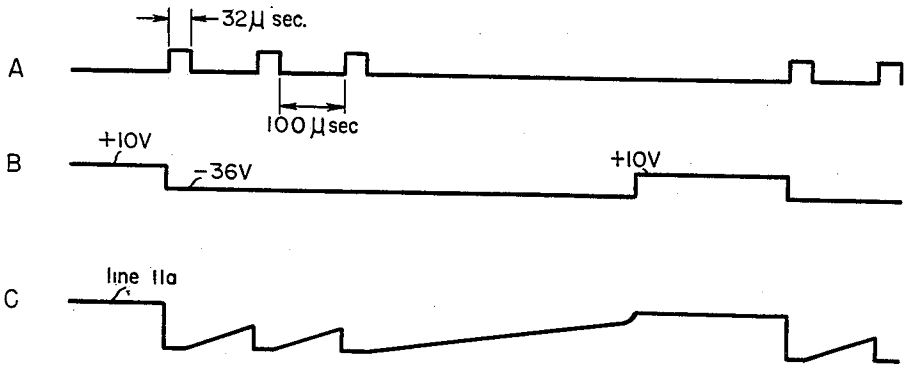
Fig. 1A is a diagrammatic representation, not to scale, of two series of square waves, repeated at regular intervals, and with a break between the first and the second such series.
Fig. 1B is a diagrammatic representation of the change in output of the single shot multivibrator during application of pulses of the type of Fig. 1A and with a break in such pulses as also illustrated in Fig. 1A.
Fig. 1C is a diagrammatic representation of the operation of the single-shot multivibrator under control of the pulses of Fig. 1A and, Fig. 2 is a detailed circuit diagram of the novel pulse group detector.

Assuming a value of $R_T$ equal to 1.5 megohm and of $C_T$ equal to 2000 micromicrofarads, the pulse width of the single-shot multivibrator may be assumed to be, within a specified degree of accuracy, 400 microseconds. Applying 32 microsecond square top pulses, as illustrated in Fig. 1A, to the input IN of the inverter 11, and these 32 microsecond pulses having a 100 microsecond average time separation, which is also indicated in Fig. 1A, the multivibrator will be flipped "on" by the first such pulse applied to the input IN, of the inverter 11, and as long as the pulses are repeated with a 100 microsecond time separation, as shown in Fig. 1A, the single-shot multivibrator will be maintained "on." This is also indicated by the curve of Fig. 1B, in which the multivibrator is indicated as being flipped "on," upon application of the first pulse, and remains "on" as long as these pulses are repeated at with the 100 microsecond time separation average. However, when the pulses are interrupted, as illustrated between the two series of pulses in Fig. 1A, so that the time separation between pulses is greater than the time period of the single-shot multivibrator, the multivibrator will slide back or be restored, as is indicated diagrammatically in Fig. 1B and as will be explained in detail presently. At this time, an output of +10 v. will be available at the cathode output of the single-shot multivibrator or other outputs may be obtained, for example, from the left hand full plate of the dual triode, as stated above, thereby indicating that a pulse group has ended, which, as stated above, may also be the indication of an end of record.

More specifically, upon the application of the first pulse, as illustrated at the extreme left of Fig. 1A, to the input IN, of inverter 11 of Fig. 2, this pulse will be inverted and will flip the single-shot multivibrator from its normal or "off" condition in which the right hand triode is conducting, to its "on" condition in which the left hand trode is conducting. Because of the difference in values of the plate resistors of the left and right hand triodes, the voltage available at tap 20 is less, when the left hand triode is conducting (multivibrator is "on"), than when the right hand triode is conducting (multivibrator is "off"). This is indicated diagrammatically only, in Fig. 1B. This "on" condition will be maintained as long as the pulses appled to the input of the inverter have a time separation, such as 100 microseconds, for example.

This action is illustrated diagrammatically in greater detail in Fig. 1C. Upon the application of the first pulse to the left, of Fig. 1A, to the input of the inverter 11, the voltage on line 11a of Fig. 2 will drop, as illustrated in Fig. 1C, and will remain at its lower level for a period approximating the duration of the applied pulse. Upon cessation of this pulse, the condenser $C_T$ will begin to charge toward a potential of +220 v., as is indicated by the first short line sloping upwards and to the right in Fig. 1C. Condenser $C_T$ continues to so charge, until the second pulse is received at the input of the inverter 11, whereupon, as is illustrated in Fig. 1C, the voltage on line 11a will again drop to its lower level, and will remain at this level until the second pulse of Fig. 1A ceases, whereupon the condenser $C_T$ will again start to charge, as indicated by the second short sloping line of Fig. 1C. The third pulse applied to the input of the inverter 11 again produces a drop in potential on line 11a, as illustrated in Fig. 1C, and this line will remain at its lower level, as illustrated, until the third pulse ceases. It is thus seen that the single-shot multivibrator will remain flipped, as long as the pulses are separated by a time interval within the time period of the single-shot multivibrator. After the third pulse is applied, as is seen from Fig. 1A, there is no further pulse immediately available and a period of time will pass equal to the timing period of the single-shot multivibrator. During this time, as illustrated in Fig. 1C by the long sloping line thereof, the condenser $C_T$ will charge, until the right hand triode of the dual triode 10 is again rendered conductive or in other words the single-shot multivibrator has been turned "off" to its normal condition. At this time, the voltage at the tap 20 will rise to a +10 v., which is indicated schematically only in Fig. 1B. The charging path of the condenser $C_T$ is from the +220 v. source, through the resistor $R_T$, line 11a, condenser $C_T$, and via the discharge path of the left hand triode to the —100 v. source. The value of $R_T$ is high in comparison to the tube resistance, so that the time constant is determined by the values of $R_T$ and of $C_T$. By variation in these values, the pulse duration of the single-shot multivibrator can be altered to fit the particular circumstances. As stated above, with a value of 2000 micromicrofarads for $C_T$ and a value of 1.5 megohms for $R_T$, the pulse period will be approximately 400 microseconds. By increasing the values of $C_T$ or $R_T$ this pulse period may be increased and by decreasing these values, the pulse period may be decreased, as desired.

Thus upon application of repeated pulses, as indicated by the first group of three pulses in Fig. 1A, the single-shot multivibrator is flipped "on" and it will be restored or flipped "off" only when the time period subsequent to the last pulse of the first group approximates the time period of the single-shot multivibrator itself, at which time the single-shot multivibrator will be restored to produce a +10 v. output at the cathode tap, which may be employed to indicate the end of a pulse group or the end of a record. It is the trailing edge of the single-shot multivibrator output which rises to a +10 v. and which is so employed as the cathode output.

Novel means have therefore been described for detecting the end of a group of pulses which may also be indicative of the end of a record.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, a single-shot multivibrator comprising a pair of cathode-coupled tubes, means coupling the plate of one tube to the grid of the other, an inverter for applying a pulse to said multivibrator, a source of voltage, a resistor and condenser connected in series between said source and the plate of one of said coupled tubes, means connecting the junction of said resistor and condenser to the grid of the other of said tubes, a source of pulses having a predetermined time separation, the value of said condenser and resistor being such that the time period of said multivibrator is greater than the time separation of said repeated pulses and means for applying said repeated pulses to the grid of said inverter, said inverter having its plate connected to said junction whereby said multivibrator is flipped by the first of said pulses and is retained in said flipped condition by said repeated pulses and said inverter releasing said multivibrator for return to its stable state upon the time separation of said repeated pulses applied to its grid being greater than the time period of said multivibrator.

2. In combination, a source of pulses having a time separation of a chosen period, a single-shot multivibrator having a time period greater than said time separation, means for applying said pulses to said multivibrator to flip said multivibrator ON and to maintain it flipped until cessation of said repeated pulses, said single-shot multivibrator comprising a pair of cathode-coupled tubes, a condenser coupling the plate of one tube and the grid of the other, a resistor connected between a source of voltage and said coupled cathodes, a tap in said last connection adjacent said cathode, a line leading from said tap and a pair of diodes connected to said line, one of said diodes having its anode connected to said line and its cathode to one fixed voltage, the other diode having its cathode connected to said line and its plate connected to a second fixed voltage whereby said line will provide a voltage at a value of one of said fixed voltages while said repeated pulses are applied to said multivibrator and said multivibrator is maintained ON, and whereby said line will provide the other of said fixed voltages when said repeated pulses are no longer applied within the time period of said multivibrator.

3. A device as in claim 2 and including a triode, means applying said repeated pulses to said grid of said triode, and means connecting the plate of said triode to said grid and to the side of said condenser connected to said last grid.

References Cited in the file of this patent

UNITED STATES PATENTS

| | | |
|---|---|---|
| 2,405,237 | Ruhlig | Aug. 6, 1946 |
| 2,500,638 | Krauth | Mar. 14, 1950 |
| 2,532,566 | Millman | Dec. 5, 1950 |
| 2,592,737 | Reynolds | Apr. 15, 1952 |
| 2,614,169 | Cohen | Oct. 14, 1952 |